United States Patent [19]
Beckett

[11] Patent Number: 5,852,502
[45] Date of Patent: Dec. 22, 1998

[54] APPARATUS AND METHOD FOR DIGITAL CAMERA AND RECORDER HAVING A HIGH RESOLUTION COLOR COMPOSITE IMAGE OUTPUT

[75] Inventor: John Patrick Beckett, Beverly Hills, Calif.

[73] Assignee: American Digital Imaging, Inc., Santa Monica, Calif.

[21] Appl. No.: 657,607

[22] Filed: May 31, 1996

[51] Int. Cl.$^6$ .................................................. H04N 1/56
[52] U.S. Cl. ........................... 358/512; 358/515; 358/514
[58] Field of Search .................................... 358/511, 512, 358/514, 515–516, 518–520, 530, 537, 538; 348/540, 33, 222, 317, 333, 336–337, 342; 382/167, 284; H04N 1/46, 1/56

[56] References Cited

U.S. PATENT DOCUMENTS

| | | | |
|---|---|---|---|
| 4,606,625 | 8/1986 | Gerswind | 352/38 |
| 5,050,984 | 9/1991 | Gerswind | 352/38 |
| 5,266,805 | 11/1993 | Edgar | 382/284 |
| 5,282,043 | 1/1994 | Cochard et al. | |
| 5,377,024 | 12/1994 | Dillinger | 358/520 |
| 5,379,069 | 1/1995 | Tani | 348/333 |
| 5,426,516 | 6/1995 | Furuki et al. | 358/520 |
| 5,668,596 | 9/1997 | Vogel | 348/222 |

*Primary Examiner*—Kim Yen Vu
*Attorney, Agent, or Firm*—Presseisen & Reidelbach, PLC; Charles F. Reidelbach, Jr.

[57] ABSTRACT

The present invention provides an apparatus and method for producing series of high resolution color composite images. The digital camera has an optical assembly that directs visual images to a high resolution monochrome sensor and a lower resolution color sensor. These two sensors, which produce a succession of frames at the same rate, are encrypted with a frame number and time code and are stored in a frame buffer. The contents of the frame buffer can be transferred to a mass storage device, or a color rendering processor that produces a composite image from the monochrome frames and color frames. During the processing of the composite image, the monochrome grayscale value becomes the composite frame grayscale value, the color frame hue value becomes the composite frame hue value, and the color frame saturation value becomes the composite frame saturation value. Alternatively, the monochrome frame grayscale value can be used to affect the composite frame hue and saturation values, or the composite frame hue and saturation values can be mapped from the color frame hue and saturation pixel linearly or non-linearly.

25 Claims, 7 Drawing Sheets

APPARATUS AND METHOD FOR DIGITAL CAMERA AND RECORDER HAVING A HIGH RESOLUTION COLOR COMPOSITE IMAGE OUTPUT

FIELD OF THE INVENTION

The present invention pertains to an apparatus and method of filming and recording color motion picture images. More specifically, the present invention pertains to a digital apparatus and method to film and record high resolution color images by combining a high resolution monochrome image and a lower resolution color image.

BACKGROUND OF THE INVENTION

Presently, apparatuses and methods for filming and recording color images can largely be categorized into two separate and distinct groups. First, there are traditional color film cameras employing well known emulsion techniques. While these systems provide a high resolution color output, they are not digital systems and thus do not inherently allow for digital processing of their recorded information. There are many known techniques to digitize the traditionally recorded film information. However, these methods are employed after the actual recording has taken place. Additionally, these methods are expensive and require large storage capacity for the digital data processing.

The second group of apparatuses and methods for filming and recording color images can be identified as television-style methods. In these methods, an electronic sensor senses an image, creates an electronic signal representing the image, and that signal is then recorded. However, in television-style methods, such as NTSC, PAL, and the like, the sensor provides an image in a analog format. While there are more recent electronic sensors, such as charge coupled devices (CCDs) which have been implemented in a digital format, they are typically still implemented in an analog format.

Both the standard emulsion process and television style methods present drawbacks. With regard to emulsion style methods, scanning analog images and converting them into a digital format is a cost above and beyond the actual cost of filming. Scanning can also be a labor intensive process that adds to cost. With regard to television style methods, most color CCDs are relatively low resolution when compared to the resolution of standard emulsion film and are in an analog format. Accordingly, the information recorded cannot be interpolated by well known digital signal processing techniques.

Also well known are methods for colorizing existing monochrome or "black & white" motion picture film stock. In such methods, a first frame of the existing black and white footage is randomly outlined to identify regions that will take on a particular set of colors. The determination of the outline and set of colors is made by an individual human operator because the actual color of the items in that first frame are unknown. The set of colors to be applied to the region are then stored in a memory buffer. In each successive frame having that same region, the set of colors in the memory buffer are then applied to that region. Typically, the selection of the regions are not on a pixel by pixel basis. Rather, each region will likely correspond to a random plurality of pixels. As a result, extremely low resolution color information is being added to a high resolution image. An additional problem occurs with these methods of colorization. Specifically, the color information added becomes increasingly inaccurate with each successive frame subsequent to the first frame. This occurs because the designated color region changes in later frames. Accordingly, a method to capture color information for each high resolution black and white frame would be preferable.

SUMMARY OF THE INVENTION

It is an objective of the present invention to reduce the storage capacity required for a high resolution digital color image and the collection of such images.

It is another objective of the present invention to reduce production and post production costs associated with scanning an analog image and converting the scanned analog image into a digital format for production and post production editing of a particular frame or frames.

It is yet another objective of the present invention to eliminate the need for standard emulsion stock when producing a motion picture.

It is a further objective of the present invention to provide simultaneous or real-time color rendering so that post production costs associated with adding color to high resolution monochrome or black and white footage is eliminated, saving time in the production of a motion picture.

It is a further objective of the present invention to provide a high resolution color image using a less expensive digital camera and recorder by using a lower resolution color sensor.

In accordance with the present invention, a digital camera and recorder is provided by an apparatus having a standard camera lens for viewing an object, a beam splitter for directing the image of the object to a first and a second sensor, the first sensor being a high resolution monochrome or black and white sensor and the second sensor being a lower resolution color sensor. The monochrome and color sensors each produce an output which is stored in a frame buffer, wherein the frame buffer stores the successive frames produced by the monochrome and the color sensors. The respective sensors produce frames at the same rate simultaneously and the frame buffer references both the time and number of the frames being stored in the buffer.

The color image frames may be viewed in real time directly on a viewing device, such as a CRT or LCD display, attached to the color sensor.

A composite high resolution color image is produced from a monochrome image and a respective color image. Specifically, the color information in one color image frame is combined with the monochrome information in one monochrome image frame having a corresponding time and frame number.

The images filmed by the digital camera can be edited prior to the production of the composite high resolution color image. Either the same viewer or a viewer similar to the one attached to the color sensor may be attached to the frame buffer. This viewer displays the previously filmed color image frames. An edit controller allows a human operator to mark particular color image frames to be discarded. Additionally, the edit controller will allow the operator to rearrange single or multiple groups of color frames. The frame buffer will then compare and identify corresponding monochrome image frames and automatically discard those frames to make the remaining monochrome image frames consistent with the color frames.

Generally, each frame generated by either the monochrome or color sensor is composed of a respective plurality of pixels. Processing of the monochrome and color images is achieved on the pixel level.

The remaining respective monochrome and color image frames are sent to a color rendering processor. In the present invention, the processor calculates the grayscale value for each pixel in each successive monochrome and color image frame. The processor also calculates the hue value (color) and the saturation value (amount of color) for each pixel in each successive color image frame.

In one embodiment, a composite pixel is generated from the grayscale value of a monochrome pixel and the hue and saturation values of the corresponding color pixel. In another embodiment, a composite pixel is generated from a hue and saturation value mapped to an array of grayscale values. The assignment of hue and saturation values in the composite image are controlled, in part, by the values in the array. Thus in this embodiment, hue and saturation are affected by high resolution grayscale values. In yet another embodiment, the high resolution grayscale values may be mapped in a linear or non-linear manner to the color hue and saturation values.

Because of the higher resolution of the monochrome images, more information is contained in those images. Accordingly, each frame of a monochrome image may be divided into subframes for more simplified data communication. In one embodiment, the color rendering processor has a single processor that sequentially processes the subframes with corresponding portions of the color image frame. In another embodiment, the color image processor contains a plurality of subprocessors equivalent to the number of subframes in a monochrome image frame. In this embodiment, the plurality of processors calculate grayscale, hue and saturation for the composite high resolution frame in parallel allowing for real time viewing of the composite images. In this real time embodiment, the composite image frames may be sent to a standard motion picture film recorder to produce a master for theater copies to be made therefrom. Alternatively, the output of the real-time color rendering processor may be sent to a digital projector or a viewing device, like a high resolution CRT or LCD display device.

These and other features and objects of the present invention will be apparent to those skilled in the art from the following detailed description, taken together with the accompanying drawings, in which:

DETAILED DESCRIPTION OF THE PREFERRED EMBODIMENT

Figure 1:
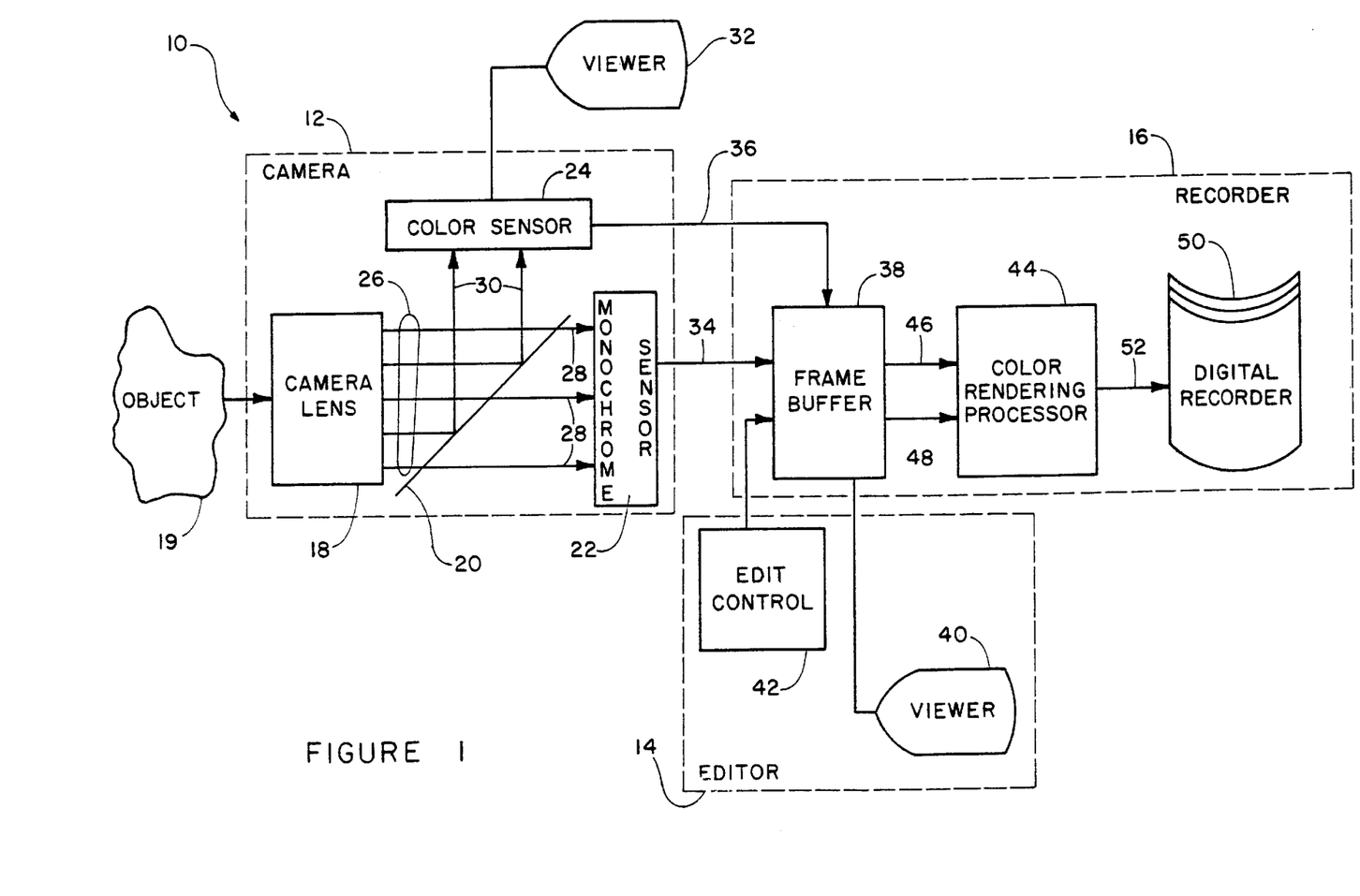
FIG. 1 is a block diagram of a system for carrying out the apparatus and method of the present invention.

An apparatus for carrying out the present invention is illustrated in FIG. 1 and generally referred to as a digital camera recorder 10. The digital camera recorder 10 is essentially composed of three subsystems: the camera 12, the editor 14, and the recorder 16.

The camera 12 includes a standard motion picture camera lens 18. The lens 18 allows the viewing on an object 19 to obtain an image therefrom. The camera lens is optically connected to a beam splitter 20 as shown by optical pathway 26. The beam splitter 20 can be any well known methods of dividing up an optical signal such as a half-silvered mirror. The beam splitter 20 directs a first beam 28 to a monochrome sensor 22 and directs a second beam 30 to a color sensor 24.

The monochrome sensor 22 and color sensor 24 can be any well known digital image sensor. Preferably, both monochrome sensor 22 and color sensor 24 are charged coupled devices (CCDs). It is possible for either or both the monochrome sensor and the color sensor to be photodiode array, charge coupled device or holographic storage. In the present invention, monochrome sensor 22 is high resolution when compared to color sensor 24. As will be described in more detail below, higher resolution monochrome sensor 22 has a greater concentration of charged coupled sensing elements on its surface as compared to the concentration of charged coupled sensing elements on the lower resolution color sensor 24. Both monochrome sensor 22 and color sensor 24 produce a succession of frames of the sensed object at the same rate simultaneously. The monochrome sensor 22 can be selected from one of many CCDs. One such selection can be a CCD operating at 24–48 frames per second, producing 3000 lines per frame, having 12 bit dynamic range, and providing as much as 4000×3000 of pixels per frame. The color image sensor 24 can be similarly selected from one of many CCDs. One such CCD can be a digitalized version of a NTSC television sensor.

In order to aid in the use of the digital camera 12, a viewer 32 may be provided. The viewer 32 can be embodied as an eye piece o digital screen giving the camera operator a means by which to view the image from the lens.

The succession of image frames from monochrome sensor 22 are sent to the frame buffer 38 by connection 34. Similarly, the succession of image frames from the color sensor 24 are sent to frame buffer 38 by connection 36. Because the monochrome sensor 22 is preferably of a higher resolution than color sensor 24, the amount of information per frame, i.e. the number of pixels per frame, of monochrome sensor 22 is greater than the number of pixels per frame of color sensor 24. Accordingly, connection 34 has a corresponding larger bandwidth and speed than that of connection 36. Alternatively, to avoid the large bandwidth, connection 34 may be a plurality of connections, as will be described below in the alternative embodiment.

The frame buffer 38 separately stores the succession of both monochrome and color image frames. The frame buffer 38 is capable of encrypting or referencing each respective corresponding frame from the monochrome and color sensors with a time code and frame number in order to enable further identification of the frames during later processing. The frame buffer 38 is intended to store these succession of frames for a relatively short time frame when compared to the duration of a feature motion picture film. The frame buffer 38 can be any well known storage device such as a hard disk, data tape, optical read/write disk, holograph storage technique or some similar digital memory storage device. Although not shown, the information in the frame buffer 38 can be downloaded to a larger storage device for later processing.

The editor 14, in FIG. 1, can be utilized to reduce the amount of color rendering. Specifically, viewer 40, which could be the same or similar to viewer 32, may be used to review the succession of color image frames in frame buffer 38. An edit control 42 controls standard reviewing functions such as play, forward, and reverse. The edit control 42 also allows a user or editor to identify or mark the color frames of the successions of color image frames that the user wishes to discard. Additionally, the edit control 42 allows the user to re-arrange the order of the color frames. This reviewing and marking can be done repeatedly until the user is satisfied with the editing that has been done. Then, the frame buffer 38 compares the succession of monochrome image frames with the color image frames and identifies those monochrome frames which correspond to the color image frames that were re-arranged or marked for discarding. Accordingly, the frame buffer 38 marks those corresponding monochrome image frames for re-arrangement or discarding and re-arranges and/or discards the corresponding high resolution monochrome frames.

The remaining matching monochrome image frames and color image frames are respectively sent to a color rendering processor 44 by way of respective connections 46, 48. The details of the method of operation of the color rendering processor 44 are set forth in greater detail below.

The output of the color rendering processor 44 is a succession of composite image frames that contain the high resolution of the monochrome image frames and the color information from the corresponding color image frames. This output is sent by way of connection 52 to a digital recorder 50. The digital recorder 50 can be any well known mass storage device, such as a hard disk, data tape, optical media, or holographic media. The color rendering processor can be any well known type of single or parallel processing element including microprocessor, microcontroller, ASIC discrete logic.

Figure 2:
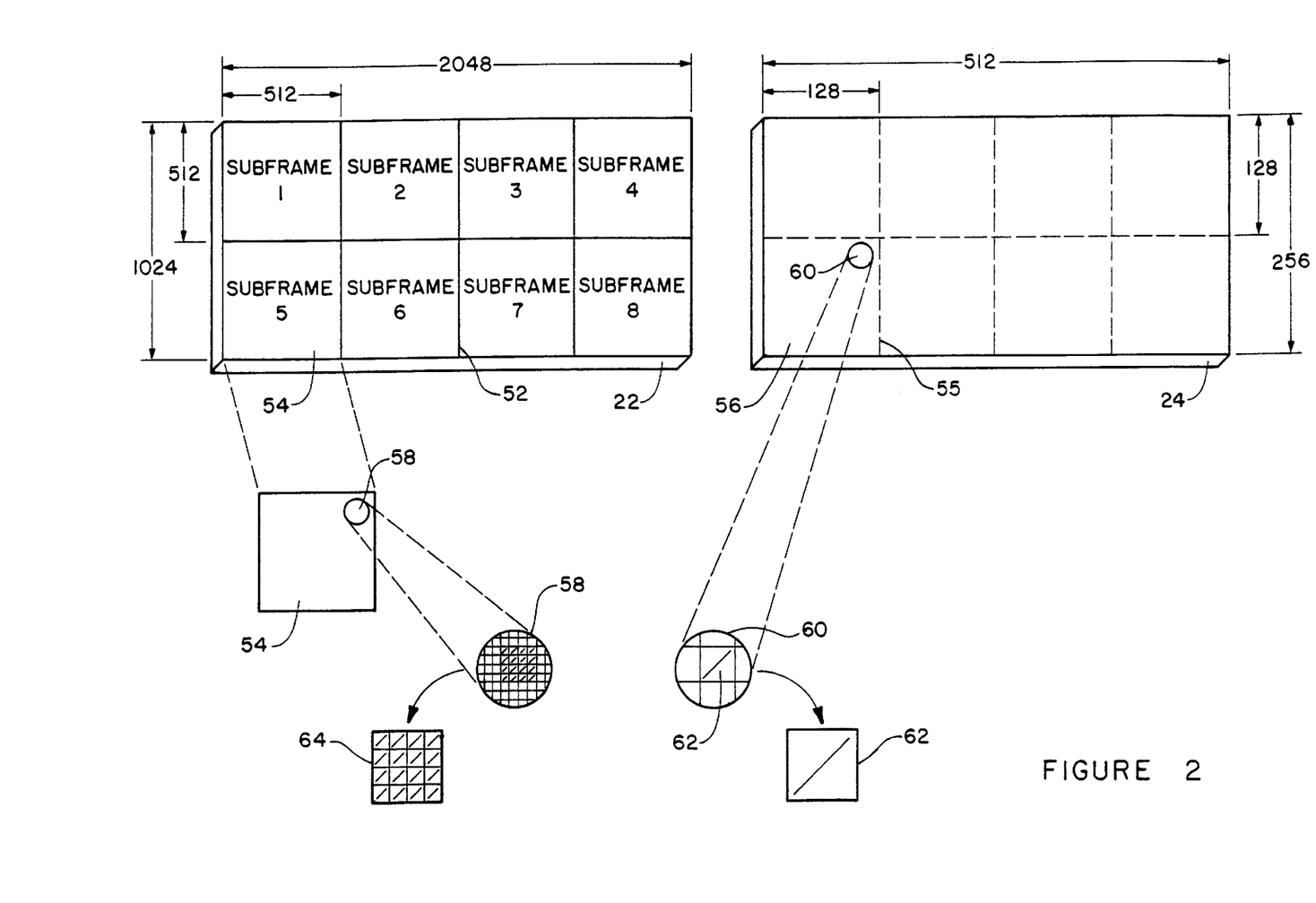
FIG. 2 is an illustration demonstrating the relationship of the sensors in the present invention.

Turning now to FIG. 2, a side-by-side comparison of the digital frames from monochrome sensor 22 and color sensor 24 is set forth. FIG. 2 only represents a demonstrative illustration of the relation of the resolution of the monochrome sensor 22 images to the color sensor 24 images. Specifically, the number of pixels in either image is only for illustrative purposes and is not intended to limit the scope of the invention described herein. As illustrated, monochrome sensor 22 and color sensor 24 have substantially the same spatial proportions.

In this illustration, the monochrome sensor 22 is an array that is 2048 pixels by 1024 pixels. The color sensor 24, on the other hand, is an array that is 512 pixels by 256 pixels. In this embodiment, monochrome sensor 22 is subdivided into eight subframes. Multiple lines 52 marks these subframes and multiple lines 55 show the corresponding subframes lines on the color image. As all the subframes are identical in size or area, the discussion will be limited to subframe region 54 which represents subframe 5, and subframe region 56 which represents a portion of color sensor 24. Further, region 58 is a circular subregion of subframe region 54 and corresponds to region 60 on color image 24.

It is important to note that the necessity of subregions is only a by-product of this particular embodiment of the present invention. Specifically, this embodiment contemplates the use of multiple lower bandwidth connections 46. There would be no need for subframes in an embodiment wherein a single high bandwidth connection 46 is implemented with an equally high bandwidth color rendering processor 44. Accordingly, the number of subframes and the mere existence of subframes in this embodiment is merely demonstrative and not intended to limit the scope of the present invention.

Region 58 contains multiple monochrome pixels that correspond to a single pixel 62 in region 60. The corresponding pixels have been identified by diagonal lines. In this demonstrative model, the pixels 64, which are sixteen (16) in number, correspond to the single color pixel 62. In order to obtain the high resolution composite image frame pixel, the grayscale information in each of the pixels 64 are combined with the hue and saturation information of pixel 62. This process is repeated for each color image frame pixel and the corresponding monochrome image pixels. In the described embodiment, the Hue-Saturation-Value model, well known in the art, was used. Any other well known video sensing model, such as Cyan-Yellow-Magenta or Red-Green-Blue, could be used.

Figure 3:
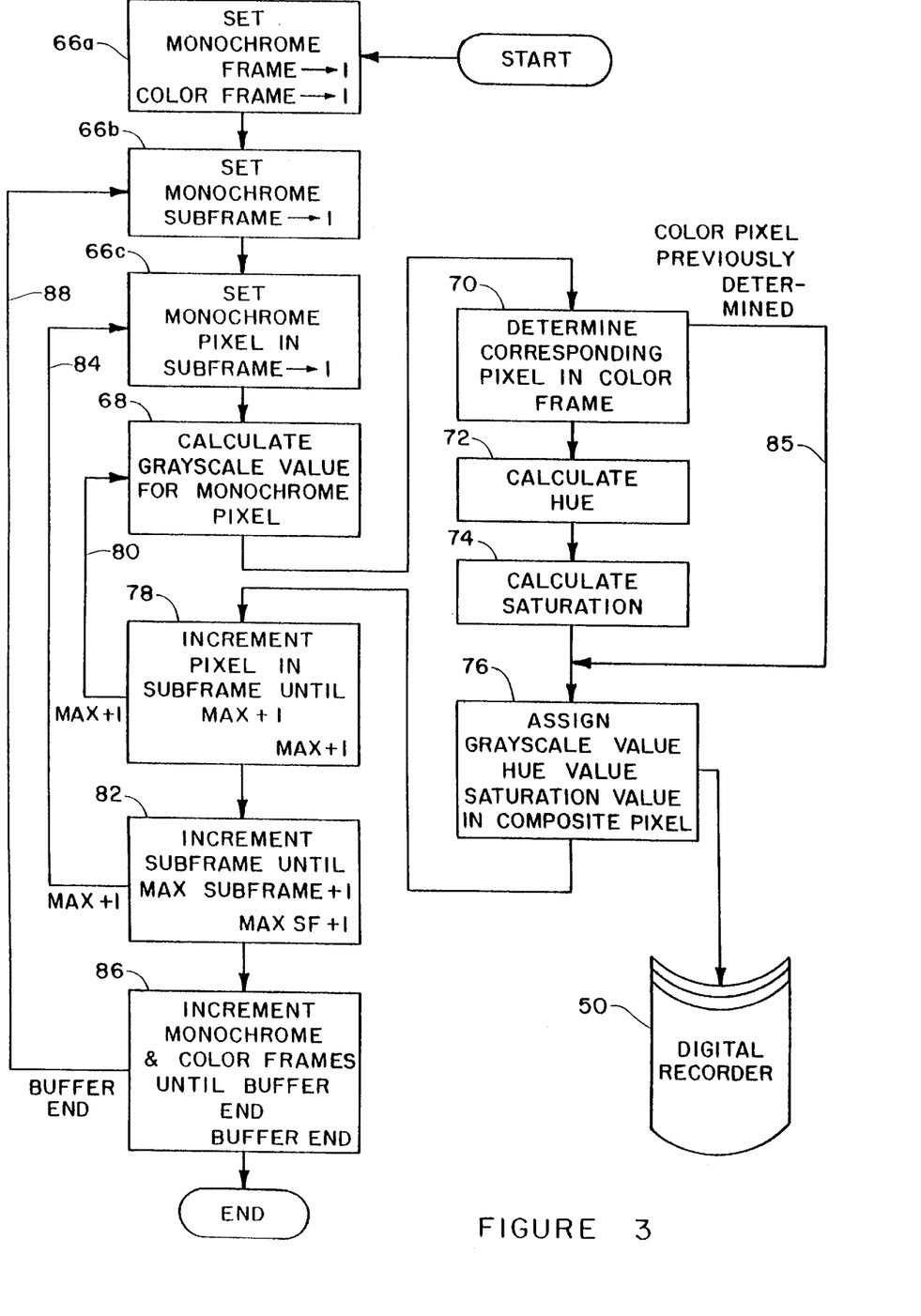
FIG. 3 is a flow chart illustrating the steps in the method of the present invention.

Turning now to FIG. 3, a method for producing the succession of composite color image frames is set forth. The method illustrated in FIG. 3 can be implemented by well known methods such as single or parrallel processing element including microprocessor, microcontroller, ASIC discrete logic. For the succession of frames in frame buffer 38, the method begins by starting with the first monochrome image frame and the first color image frame, step 66a. In steps 66b and 66c, the color rendering processor 44 begins by processing the first pixel in the first subframe 54. The color rendering processor uses the information stored for the first monochrome image frame pixel and uses the grayscale value associated with that pixel, step 68. The grayscale value is the degree of darkness or lightness in a particular pixel. In the present invention, it is foreseen that the monochrome sensor 22 will produce grayscale values of a fixed bit width. For instance, 8 bits of grayscale results in 256 different grayscale values whereas 12 bits of grayscale results in 4096. In the preferred embodiment, the monochrome sensor 22 produces a 12 bit wide grayscale value, whereas the color sensor produces a 8 bit wide grayscale value. However, any number of bit widths may be used to implement the present invention.

The corresponding color pixel stored in frame buffer 38 is determined, step 70. From this pixel, a hue value and a saturation value are calculated, step 72, 74. The hue value of a color pixel is the shade of color in a pixel. The saturation value of a color pixel is the amount of the hue or shade of color in a pixel. It should be noted that each color pixel also contains its own grayscale information. This information is used in an alternative embodiment.

Generation of the composite pixel occurs after the calculation of the grayscale value of the monochrome pixel and the calculation of the hue and saturation values of the color pixel. The composite pixel is created by assigning the grayscale value of the monochrome pixel to the grayscale value of the composite pixel and assigning the hue and saturation values of the corresponding color pixel to the composite pixel, step 76. The resulting composite pixel is then recorded in digital recorder 50.

This process is repeated for each pixel in the first subframe 1, step 78. Step 78 and logic pathway 80 illustrates that the next monochrome pixel is considered until the last pixel (with the maximum address) in the first subframe has been processed. Logic pathway 85 represents the situations wherein subsequent monochrome pixels correspond to a color pixel that was identified in a prior repetition of step 70. This repetitive process results in the sequential execution of steps 68, 70, 72, 74, and 76 until the last pixel in the first subframe has been processed.

Similarly, the repetitive process of executing steps 68, 70, 72, 74, 76, and 78 for each of the subframes in a monochrome image frame is performed, step 82 and logic pathway 84. The increment from one subframe to the next occurs when the last pixel of each subframe, except for the last subframe, has been processed. This similarity is further paralleled in the processing of one monochrome image frame to the next. The repetitive process of executing steps 68, 70, 72, 74, 76, 78, and 82 for each frame in the frame buffer is performed, step 86 and logic pathway 88. When the last pixel of the last subframe in a monochrome image frame has been processed, the next monochrome image frame is processed.

While not shown, the method illustrated in FIG. 3 can be operated such that successive packets of camera information can be loaded into frame buffer 38, processed and then sent to a digital recorder. This would allow color processing at some time after the actual filming.

Figure 4:
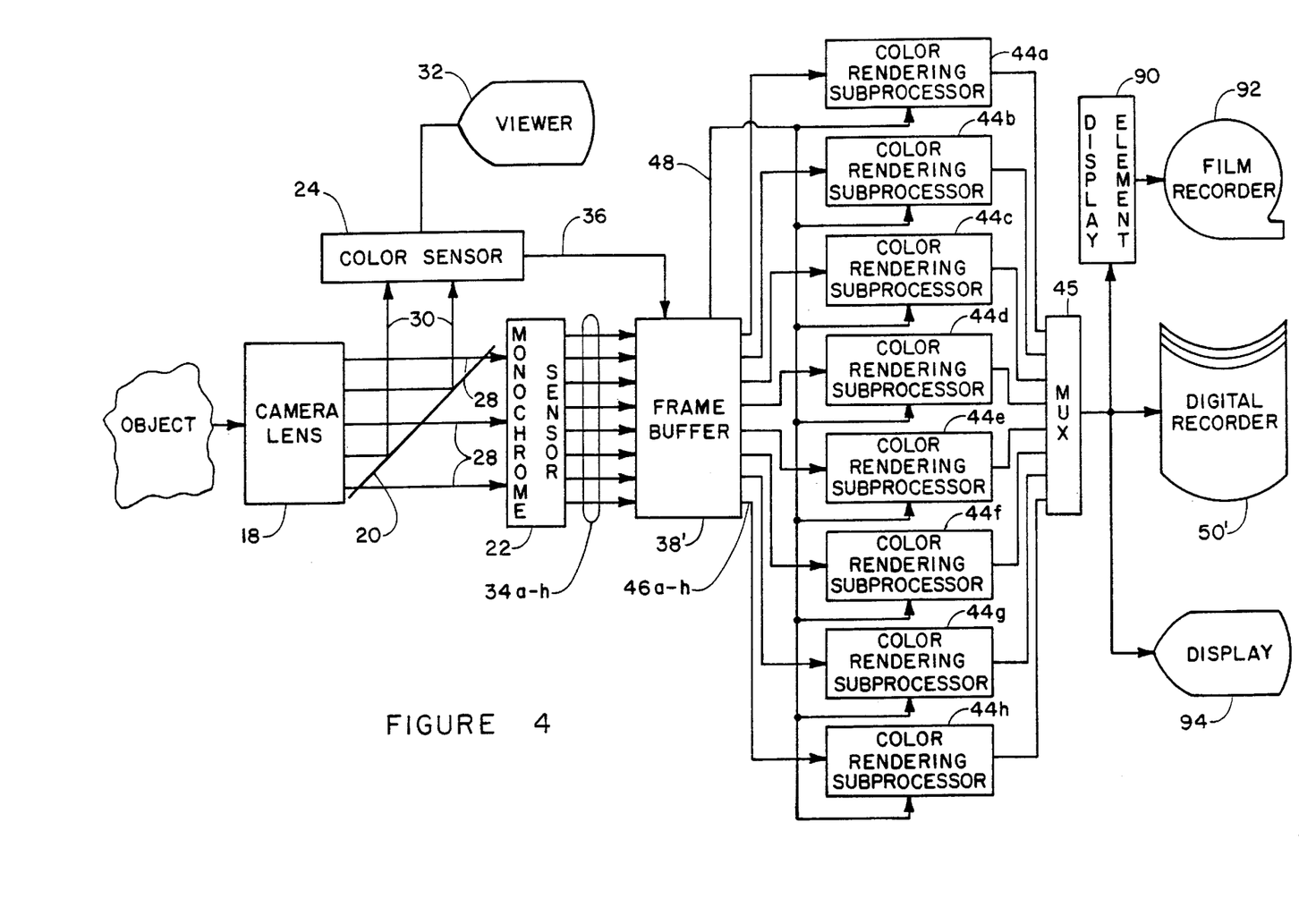
FIG. 4 is a block diagram of an alternative system for carrying out the apparatus and method of the present invention.

An alternative preferred embodiment illustrated in FIG. 4. Specifically, FIG. 4 illustrates the present invention wherein the color rendering processor 44 is a plurality of color rendering subprocessors 44a–h capable of parallel processing at a rate sufficient to allow for real time viewing or recording the composite images. While FIG. 4 illustrates eight separate color rendering subprocessors 44a–h, it is to be understood that there can be any number of color rendering subprocessors. FIG. 4 illustrates eight to correspond to the demonstrative example set forth in FIG. 2. Therefore, it is envisioned that there can be "n" number of color rendering subprocessors. Additionally, as FIG. 4 is similar to FIG. 1, the distinctions between the figures will be set forth.

In FIG. 4, the present invention includes a monochrome sensor 22'. The output of monochrome sensor 22' consists of eight connections 34a–h to frame buffer 38'. Each of these connections 34a–h respectively correspond to a subframe of monochrome sensor 22'. The color sensor 24 and connection 36 remains unchanged.

As the embodiment illustrated in FIG. 4 is a real-time implementation of the present invention, no editing features, such as edit control 42 or viewer 40 are provided. Such editing can be accomplished at a later time on the composite image frames themselves. Frame buffer 38' has the added capacity to accept multiple connects 34a–h and organize the successions of subframes simultaneously so that they can be accessed on connections 46a–h as a single monochrome frame. The time code and frame number marking of corresponding monochrome and color image frames is still performed by frame buffer 38'.

The color rendering subprocessors 44a–h accepts the monochrome image frame information in its constituent subframe components from connections 46a–h. The details of the method for color rendering processing is discussed in greater detail below.

The output of color rendering subprocessors 44a–h is realtime high resolution composite color images and can be sent to any well known storage devices by a coordinating device, such as multiplexer 45. The multiplexer 45 in turn directs the succession of composite color images to any well known mass storage device.

In this embodiment, because the output is real time, the composite images can be stored in their digital state or converted to an analog output for recordation onto a standard emulsion. First, the outputs of the color rendering subprocessors can be input to a high resolution display element 90. High resolution display element 90 is coupled with motion picture film recorder 92. As a result, the succession of high resolution composite images are recorded on standard motion picture film. This implementation would allow for recording of all composite images onto standard motion picture film and editing that film using standard analog film editing equipment. Second, the output can be received by a digital recorder 50'. In this implementation, the digital recorder records the succession of composite image frames. At a later time, the recording can be played back and edited on a digital editing device to result in an edited version of the succession of composite image frames. The edited succession of composite image frames then can be displayed on a high resolution display element which is coupled to a motion picture film recorder to produce a film version of the edited succession of composite images. Finally, the succession of composite images can be viewed directly on a high resolution display 94. High resolution display 94 can be any well known such display such as any large screen LCD or specialized CRT.

Figure 5A:
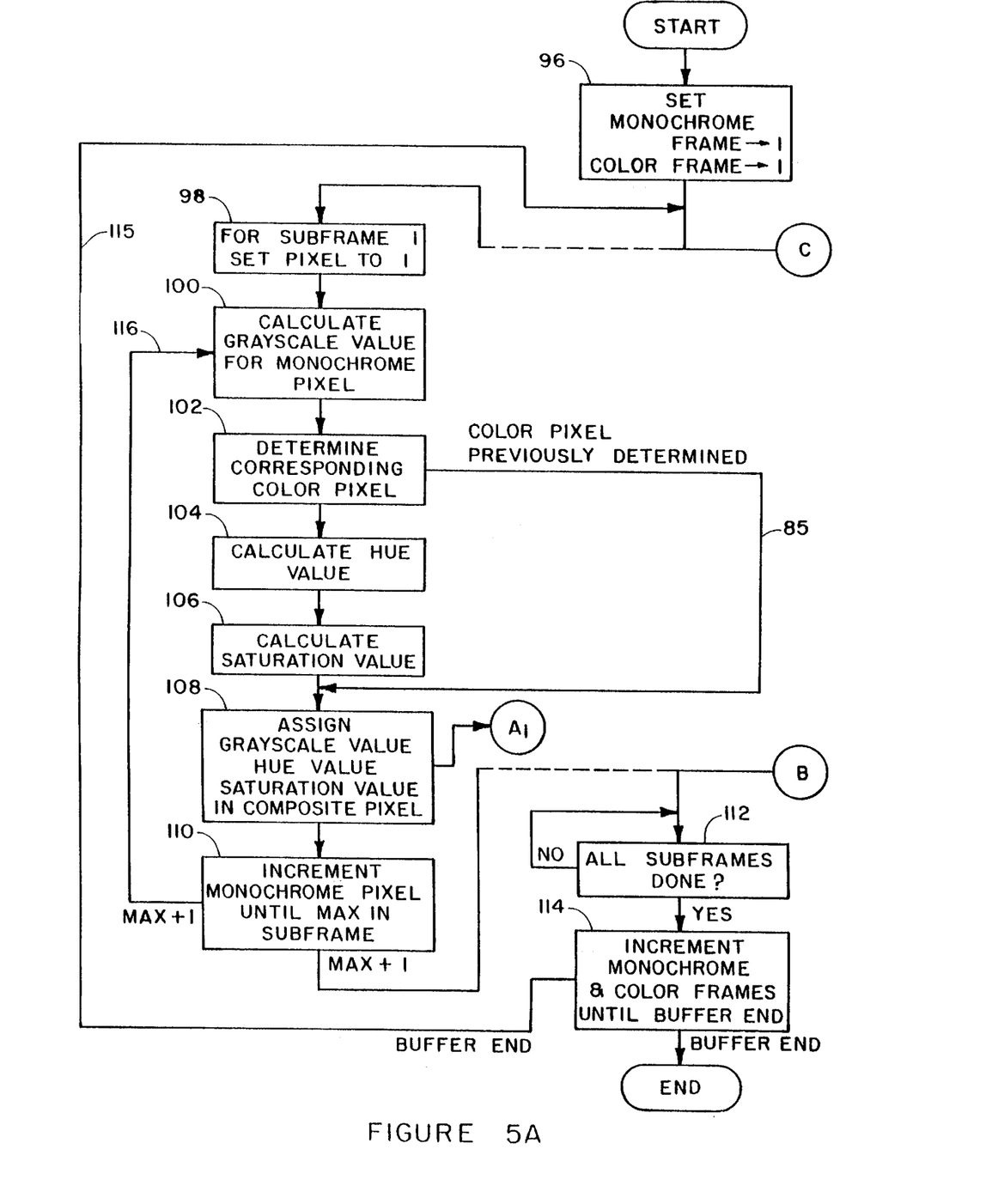
FIG. 5 is a flow chart illustrating the steps in an alternative method of the present invention.
Figure 5B:
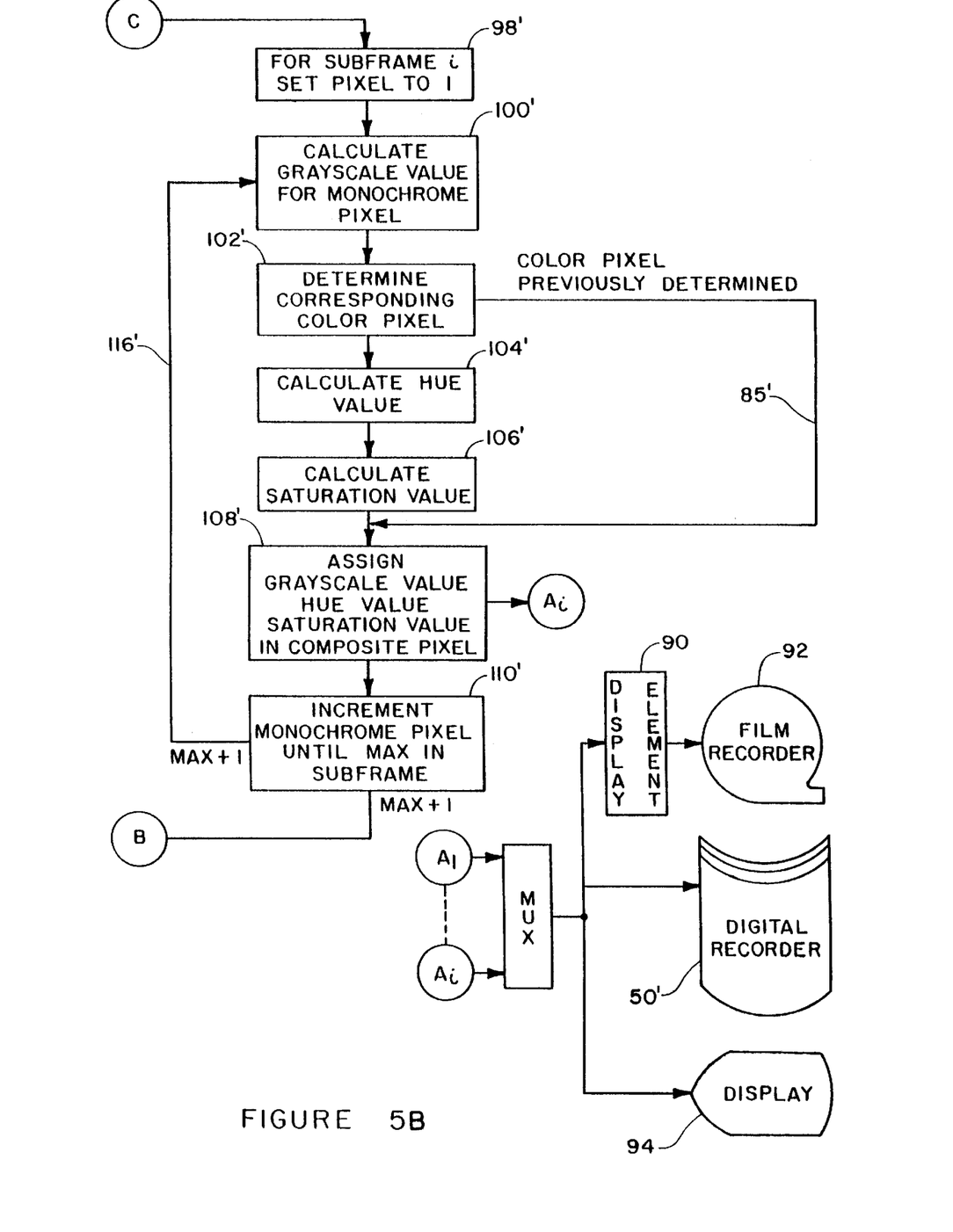

Turning now to FIG. 5, the method of color rendering performed by color rendering subprocessor 44a–h begins with the first monochrome image frame and the first color image frame, step 96. The method illustrated in FIG. 5 can be implemented by well known methods such as proprietary software, ASIC or embedded CPU. For each subframe in the monochrome image frame, a separate color rendering subprocessor is provided. The following steps are executed in parallel by a number of subprocessors equal to the number of subframes in a monochrome image frame. This is illustrated in FIG. 5 by steps 98, 100, 102, 104, 106, 108, and 110 being identical and parallel to steps 98', 100', 102', 104', 106', 108', 110'. Accordingly, the steps set forth for subframe 1 are repeated for each subframe.

As with FIG. 4, FIG. 5 shows eight subprocessors in order to follow through with the demonstrative example from FIG. 2. Thus, it is envisioned that there could be "n" number of subprocessors and FIG. 5 is merely demonstrative and not intended to limit the scope of the present invention.

The color rendering subprocessor 44a–h begins with the first pixel in each subframe, step 98. Then, the grayscale value of that first pixel is calculated, step 100. The corresponding color pixel is determined in step 102. From that corresponding color pixel, a hue value and saturation value are determined, steps 104 and 106. The grayscale, hue, and saturation value of the composite pixel are assigned, step 108, and then the pixel information can be recorded in any well known mediums, such as those discussed above: motion picture film recorder 92, digital recorder 50, or high resolution display 94. The next pixel in the subframe is acquired by the color rendering subprocessor, step 110. This process continues until all pixels in a subframe have been processed by the color rendering subprocessor 44a–h for that subframe, step 110 and logic pathway 116. When all color rendering subprocessors have completed processing their respective subframes, step 112, the next monochrome frame is acquired by the color rendering subprocessor 44a–h and the subframes are distributed to the respective color rendering subprocessors until all of the monochrome frames in frame buffer 38' have been processed, step 114 and logic pathway 115.

Figure 6:
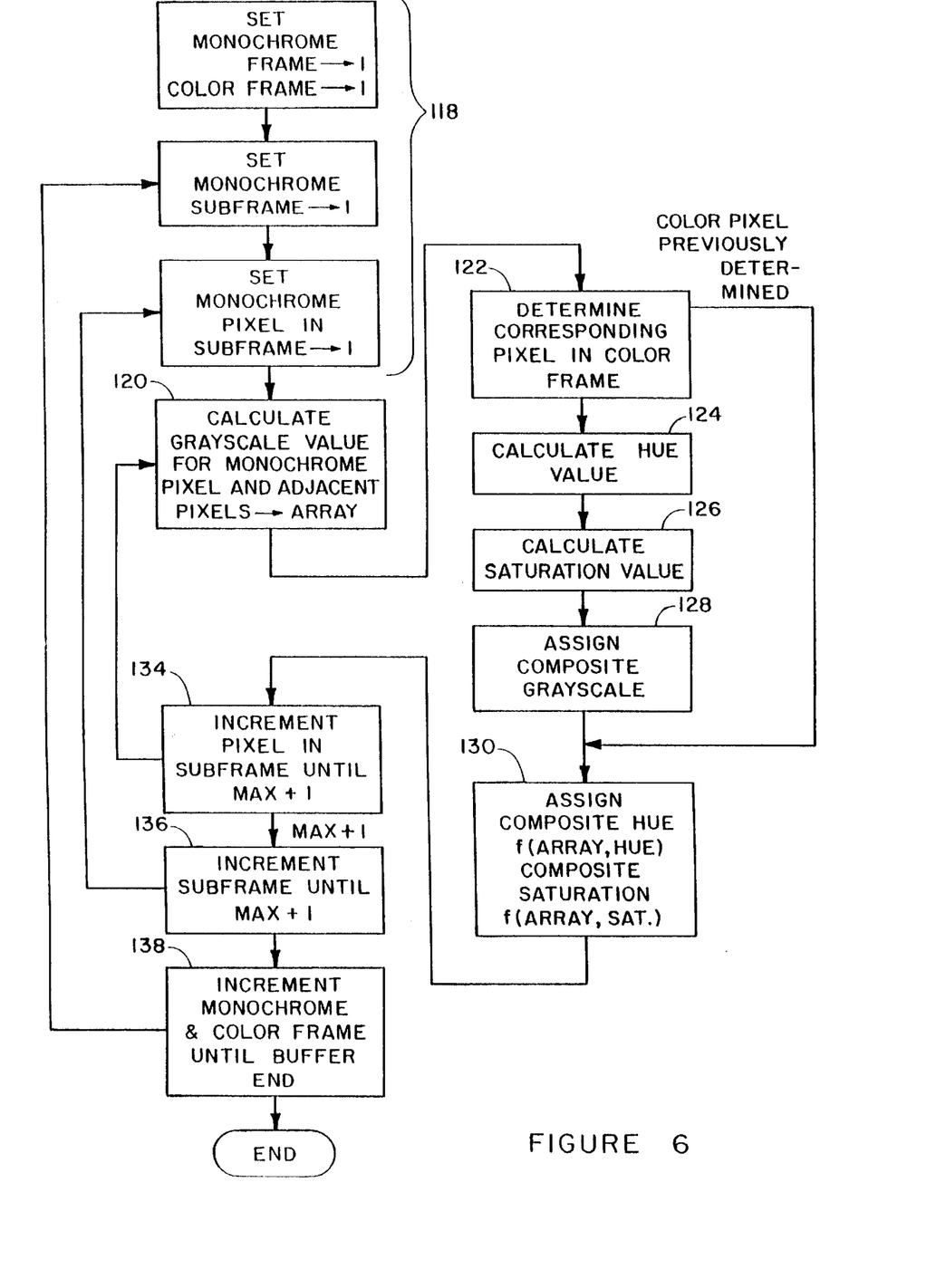
FIG. 6 is a flow chart illustrating the steps in yet another alternative method of the present invention.

In FIG. 6, a method is illustrated to calculate the composite pixel hue and saturation values. The method illustrated in FIG. 6 can be implemented by well known methods such as proprietary software, ASIC, or embedded CPU. In the below description, hue and saturation are dealt with together. However, it is to be understood that hue and saturation values are independent. Thus corresponding values in the color pixel and composite pixel are directed to respective hue values or respective saturation values only.

Similar to the other methods, the color rendering processor begins by acquiring the grayscale values of the first pixel of the first subframe in the first monochrome image frame, step 118. In the previous approaches, a sequential method of processing the monochrome pixels was described. It is to be understood that the below method can be applied to the sequential method. However, in this alternative approach, the color rendering processor acquires the grayscale values of the pixels surrounding to the current monochrome pixel and calculates an array of variance of the adjacent pixels, step 120. The corresponding color pixel is determined so that the hue and saturation values can be calculated therefrom, steps 122, 124, and 126. The grayscale value is assigned to a composite image pixel based on the grayscale information of the monochrome image frame, step 128. The significant difference in this embodiment is the methods used to assign hue and saturation values.

In the present invention, the hue and saturation resolution of the composite pixels are greater than the resolution of the color pixels. Only as a demonstrative example, the resolution of the composite pixel may be 12 bits wide for 4096 states whereas the bit resolution of the color pixel may only be 8 bits for 256 states. As a method to determine the composite hue and saturation values, these values are assigned based on the hue and saturation value of the color image pixel and the monochrome grayscale values in the array of variances, steps 130, 132. Specifically, the additional hue and saturation resolution of the composite pixel is scaled up by the array of variances because the pixels in that array have the same resolution as the composite image frames.

As with prior methods, the color rendering processor increments through the pixels of a subframe, through the subframes of a monochrome frame, and the succession of frames in the frame buffer 38 until the end of the buffer is reached, steps 134, 136, and 138. In this example, incrementing the pixels in the subframe, step 134, differs from the prior examples because the processor handles an array of monochrome pixels as opposed to one monochrome pixel at a time. Therefore, when incrementing, it is contemplated that an incremental value will be selected so that subsequent array of variances will not affect any previously considered monochrome pixel. Although not specifically illustrated, this method can also be implemented with a plurality of color rendering subprocessors to achieve real time interpolation.

The table below illustrates two approaches to calculating the composite pixel values. Specifically, this embodiment relates to a method of producing composite hue and saturation values by scaling up the color grayscale information linearly or non-linearly.

TABLE

| LINEAR APPROACH LOWER RESOLUTION COLOR PIXEL HUE AND SATURATION VALUE | HIGH RESOLUTION COMPOSITE PIXEL HUE AND SATURATION VALUE |
| --- | --- |
| Decimal 0 | Decimal 0–15 |
| Decimal 1 | Decimal 16–31 |
| . . . | . . . |
| Decimal 254 | Decimal 4064–4079 |
| Decimal 255 | Decimal 4080–4095 |
| NONLINEAR APPROACH #1 LOWER RESOLUTION COLOR PIXEL HUE AND SATURATION VALUE | HIGH RESOLUTION COMPOSITE PIXEL HUE AND SATURATION VALUE |
| Decimal 0 | Decimal 0–7 |
| Decimal 1 | Decimal 8–15 |
| . . . | . . . |
| Decimal 254 | Decimal 4048–4063 |
| Decimal 255 | Decimal 4080–4095 |
| NONLINEAR APPROACH #2 LOWER RESOLUTION COLOR PIXEL HUE AND SATURATION VALUE | HIGH RESOLUTION COMPOSITE PIXEL HUE AND SATURATION VALUE |
| Decimal 0 | Decimal 0–7 |
| Decimal 1 | Decimal 8–15 |
| . . . | . . . |
| Decimal 254 | Decimal 2031–2039 |
| Decimal 255 | Decimal 2040–2047 |

As shown in the table, the composite pixel hue and saturation values can be linearly mapped from the color hue and saturation information. From the prior examples, where the color image frames have an 8 bit resolution and the composite image frames have a 12 bit resolution, it should be apparent that there are 16 hue and saturation values for each color hue and saturation value. In the linear approach, each color hue and saturation value can be one of 16 composite hue and saturation values. Where there is no need to stress a particular color or brightness of a color, the composite hue and saturation values are determined in the linear approach of 16 hue and saturation values for each low resolution color pixel hue and saturation value. However, where a particular color is to be emphasized, a non-linear approach can be taken.

The nonlinear approach represents an alternative method of composite hue and saturation value calculation. In the situation where a visual subject is light in shade, for example, there may be a desire to have a greater emphasis on lighter hue and saturation values. Accordingly, increasingly darker low resolution color pixel hue and saturation values are mapped to lighter grayscale hue and saturation values. The above table provides two illustrations of this approach. In these examples, the lighter colors and shades are represented by lower value decimal numbers. The emphasis on lighter colors is achieved by mapping the lower values of low resolution color pixel hue and saturation values to only 8 states. This is to be distinguished from the mapping of lower value hue and saturation values of the low resolution color pixel to 16 states in the linear approach. Effectively, this approach scales low resolution color to lighter shades in the composite pixel. Further, for darker hue and saturation values of the lower resolution color pixel, two approaches are detailed in the above table.

In the first approach, the hue and saturation values of the lower resolution color pixel are mapped to non-contiguous composite hue and saturation values. For example, low resolution color hue and saturation decimal value 254 is mapped to composite hue and saturation value 4048 to 4063 and low resolution color hue and saturation decimal value 255 is mapped to composite hue and saturation value 4080 to 4095 in order to emphasize lighter shades. Specifically, the darker colors are less prevalent because composite pixel values 4064–4079 are not utilized. However, in this approach, some of the darkest color still remain.

In the second approach, the darkest colors are not utilized. This is shown by virtue of the fact that low resolution hue and saturation value 254 is mapped to composite pixel hue and saturation values 2031–2039 and low resolution hue and saturation value 255 is mapped to composite pixel hue and saturation values 2040–2047.

The overall effect of this scaling is to emphasize lighter colors in the composite pixel by forcing the low resolution color to be mapped to lighter composite color values. While not specifically stated, this same approach can be utilized to emphasize any particular range of colors such as, but not limited to, darker colors, mid range colors, or a specific color.

While this particular apparatus as herein shown and disclosed in detail is fully capable of obtaining the objects and providing the advantages herein before stated, it is to be understood that it is merely illustrative of the presently preferred embodiments of the invention and that no limitations are intended to the details of the construction or design herein shown other than as defined in the appended claims.

I claim:

1. An apparatus for producing a color image from a visual input comprising:

an optical assembly for receiving said visual input;

a first sensor operably connected to said optical assembly, said first sensor producing a monochromatic image from said visual input;

a second sensor operably connected to said optical assembly, said second sensor producing a color image from said visual input;

a processor for producing a composite image from said monochromatic image and said color image;

wherein said first sensor is high resolution respective to said second sensor;

wherein said first sensor produces a first plurality of pixels representative of said visual image;

wherein said second sensor produces a second plurality of pixels representative of said visual image;

wherein each of said second plurality of pixels corresponds to at least one of said first plurality of pixels;

wherein each of said first plurality of pixels has a grayscale value;

wherein each of said second plurality of pixels has a hue value and a saturation value;

wherein said composite image comprises a third plurality of pixels, said third plurality of pixels respectively corresponding to said first plurality of pixels;

wherein each of said third plurality of pixels has a respective composite grayscale value, said respective composite grayscale value being equal to said respective grayscale value of said first plurality of pixels;

wherein each of said third plurality of pixels has a respective composite hue value, said respective composite hue value being said hue value of said second plurality of pixels; and wherein each of said third plurality of pixels has a respective composite saturation value, said respective composite saturation hue value being said saturation value of said second plurality of pixels.

2. A method for reproducing visual images comprising the steps of:

directing a plurality of visual images to a first image sensor and a second image sensor;

producing a plurality of monochrome image frames respectively from said plurality of visual images, each of said plurality of monochromatic image frames having a first plurality of pixels;

producing a plurality of color image frames respectively from said plurality of visual images, each of said plurality of color image frames having a second plurality of pixels;

respectively combining said plurality of monochrome image frames with said plurality of color image frames to produce a plurality of composite image frames, each of said plurality of composite image frames having a plurality of composite pixels;

wherein the step of producing a plurality of monochrome image frames is producing a plurality of high resolution monochrome image frames, said first plurality of pixels is a plurality of high resolution pixels, said second plurality of pixels is a plurality of low resolution pixels, each of said plurality of low resolution pixels corresponding to at least one of said plurality of high resolution pixels, said plurality of composite pixels respectively corresponding to said high resolution pixels;

producing a hue variable for each low resolution pixel;

producing a saturation variable for each low resolution pixel;

producing a high resolution grayscale value variable for each high resolution pixel; and producing a plurality of arrays for each of said plurality of high resolution pixels, each of said arrays containing a plurality of high resolution grayscale value variables adjacent to each of said high resolution pixels.

3. A method as in claim 2 wherein said step of combining further comprises the step of:

adjusting said hue variable of any one of said plurality of composite image pixels respectively based on one of said plurality of arrays and respectively based on one corresponding said hue variable.

4. A method as in claim 2 wherein said step of combining further comprises the step of:

adjusting said saturation variable of one of said plurality of composite image pixels respectively based on one of said plurality of arrays and respectively based on one corresponding said saturation variable.

5. A method for producing a color motion picture comprising the steps of:

directing a plurality of visual images to a first image sensor and a second image sensor;

producing a plurality of monochrome image frames respectively from said plurality of visual images;

producing a plurality of color image frames respectively from said plurality of visual images;

combining said plurality of monochrome image frames with said plurality of color images to produce a plurality of composite image frames, each of said plurality of composite image frames having a plurality of composite pixels;

recording said plurality of composite image frames;

viewing said plurality of color image frames;

selectively editing said plurality of color image frames whereby a portion of said plurality of color image frames are discarded or re-arranged to result in a resultant plurality of color image frames;

matching said resultant plurality of color image frames with respective said plurality of monochrome image frames to produce a resultant plurality of monochrome image frames; and discarding any one of said plurality of monochrome image frames not corresponding to any one of said resultant plurality of monochrome image frames.

6. A method as in claim 5 wherein said step of producing said resultant plurality of monochrome image frames is producing a resultant plurality of high resolution monochrome image frames relative to said resultant plurality of color image frames, each of said plurality of high resolution monochromatic image frames having a first plurality of pixels, each of said resultant plurality of color image frames having a second plurality of pixels, each of said second plurality of pixels corresponding to at least one of said first plurality of pixels.

7. A method as in claim 6 wherein said step of combining said resultant plurality of monochrome images with said resultant plurality of color images further includes the steps:

generating a first grayscale value for each of said first plurality of pixels in each of said resultant plurality of high resolution monochrome image frames;

generating a second grayscale value for each of said second plurality of pixels in each of said plurality of color frames, said second grayscale value having less resolution than said first grayscale value;

combining respectively said first grayscale value and said second grayscale value to produce a composite grayscale value for each of said plurality of composite pixels in each of said plurality of composite image frames;

generating a hue value for each of said second plurality of pixels in each of said resultant plurality of color frames;

generating a saturation value for each of said second plurality of pixels in each of said resultant plurality of color frames;

producing a composite hue value for each of said plurality of composite pixels in each of said plurality of composite image frames from respective said hue value and said composite grayscale value; and producing a composite saturation value for each of said plurality of composite pixels in each of said plurality of composite image frames from respective said saturation value and said composite grayscale value.

8. A method as in claim 7 wherein combining said first grayscale value and said second grayscale value is linear.

9. A method as in claim 7 wherein combining said first grayscale value and said second grayscale value is non-linear.

10. A method as in claim 6 wherein said step of said combining said resultant plurality of monochrome image frames with said resultant plurality of color images further includes the steps:

generating a grayscale value for each of said first plurality of pixels in each of said resultant plurality of high resolution monochrome image frames;

generating a hue value for each of said second plurality of pixels in each of said resultant plurality of color frames;

generating a saturation value for each of said second plurality of pixels in each of said resultant plurality of color frames;

generating an array for each of said first plurality of pixels in each of said resultant plurality of high resolution monochrome image frames, said array containing grayscale values of said first plurality of pixels adjacent to one of said first plurality of pixels;

generating a composite hue value for each of said plurality of composite pixels in each of said plurality of composite image frames from said hue value and said array;

generating a composite saturation value for each of said plurality of composite pixels in each of said plurality of composite image frames from said saturation value and said array; and generating a composite grayscale value for each of said plurality of composite pixels in each of said plurality of composite image frames from said array.

11. An apparatus for producing a series of color images from a visual input comprising:

an optical assembly for receiving said visual input;

a first sensor operably connected to said optical assembly, said first sensor producing a plurality of monochrome image frames from said visual input;

a second sensor operably connected to said optical assembly, said second sensor producing a plurality of color image frames from said visual input, each of said plurality of color image frames respectively corresponding to one of said plurality of monochromatic image frames;

a processor for producing a plurality of composite image frames from said plurality of monochromatic image frames and said plurality of color image frames;

wherein said first sensor is high resolution respective to said second sensor;

wherein each frame of said plurality of monochromatic image frames has a first plurality of pixels;

wherein each frame of said plurality of color image frames has a second plurality of pixels;

wherein each of said second plurality of pixels corresponds to at least one of said first plurality of pixels;

a frame storage assembly operably connected to said first sensor by a monochrome data line, said monochrome data line transferring said plurality of monochrome image frames;

wherein said frame storage assembly being operationally connected to said second sensor by a color data line, said color data line transferring said plurality of color image frames;

a color image display for displaying said plurality of color image frames stored in said frame storage assembly;

means to selectively view said plurality of color image frames;

means to selectively discard at least one of said plurality of color image frames; and means to automatically discard at least one of said plurality of monochrome image frames corresponding to said at least one of said plurality of color image frames.

12. An apparatus as in claim 11:

wherein said monochrome data line is a plurality of monochrome data lines;

wherein said first sensor further comprises a plurality of subdivisions, each of said plurality of subdivisions respectively corresponding to said plurality of monochrome data lines; and wherein each of said plurality of monochrome frame images being comprised of said plurality of sub-frame images respectively corresponding to said plurality of subdivisions.

13. An apparatus as in claim 12:

wherein said plurality of monochrome data lines is a first plurality of monochrome data lines;

wherein said color data line is a first color data line;

said apparatus further comprising:

a color rendering processor operably connected to said frame storage assembly by a second plurality of monochromatic data lines, said color rendering processor operably connected to said frame storage assembly by a second color data line, said color rendering processor sequentially processing said plurality of sub-frame images with corresponding said plurality of color image frames to produce a plurality of composite image frames; and a recorder to record said plurality of composite image frames for later real time playback.

14. An apparatus as in claim 12:

wherein said plurality of monochrome data lines is a first plurality of monochromatic data lines;

wherein said color data line is a first color data line;

said apparatus further comprising:

a plurality of color rendering processors, said plurality of color rendering processors respectively operably connected to said frame storage assembly by a second plurality of monochromatic data lines;

wherein each of said plurality of color rendering processors being operably connected to said frame storage assembly by a second color data line;

wherein said plurality of color rendering processors concurrently processes respective said plurality of subframes of each said plurality of monochrome image frames with said plurality of color image frames to produce a plurality of composite image frames in real time.

15. An apparatus as in claim 14 further comprising a recorder to record said plurality of composite image frames.

16. An apparatus as in claim 15 wherein said recorder is a digital mass storage device.

17. An apparatus as in claim 15 further comprising a display device for viewing said plurality of composite image frames.

18. An apparatus as in claim 17 wherein said display device transmits said plurality of composite image frames to a motion picture film recorder.

19. An apparatus as in claim 11 wherein said first sensor is a first charge coupled device and said second sensor is a second charge coupled device.

20. An apparatus as in claim 11 further comprising:

a lens assembly for receiving said visual input; and a beam splitter for simultaneously directing said visual input to said first sensor and to said second sensor.

21. A method for reproducing visual images comprising the steps of:

directing a plurality of visual images to a first image sensor and a second image sensor;

producing a plurality of monochrome image frames respectively from said plurality of visual images, each of said plurality of monochromatic image frames having a first plurality of pixels;

producing a plurality of color image frames respectively from said plurality of visual images, each of said plurality of color image frames having a second plurality of pixels;

respectively combining said plurality of monochrome image frames with said plurality of color image frames to produce a plurality of composite image frames, each of said plurality of composite image frames having a plurality of composite pixels;

wherein the step of producing a plurality of monochrome image frames is producing a plurality of high resolution monochrome image frames, said first plurality of pixels is a plurality of high resolution pixels, said second plurality of pixels is a plurality of low resolution pixels, each of said plurality of low resolution pixels corresponding to at least one of said plurality of high resolution pixels, said plurality of composite pixels respectively corresponding to said high resolution pixels;

producing a hue variable for each low resolution pixel;

producing a saturation variable for each low resolution pixel;

producing a high resolution grayscale value variable for each high resolution pixel;

applying said hue variable to a portion of said plurality of composite image pixels;

applying said saturation variable to said portion of said plurality of composite image pixels; and applying said high resolution grayscale value variables respectively to one of said plurality of composite image pixels.

22. A method as in claim 21 further comprising the step:

repeating said step of combining for each of said plurality of high resolution pixels in each said plurality of high resolution monochrome image frames.

23. A method for reproducing visual images comprising the steps of:

directing a plurality of visual images to a first image sensor and a second image sensor;

producing a plurality of monochrome image frames respectively from said plurality of visual images, each of said plurality of monochromatic image frames having a first plurality of pixels;

producing a plurality of color image frames respectively from said plurality of visual images, each of said plurality of color image frames having a second plurality of pixels;

respectively combining said plurality of monochrome image frames with said plurality of color image frames to produce a plurality of composite image frames, each of said plurality of composite image frames having a plurality of composite pixels;

wherein the step of producing a plurality of monochrome image frames is producing a plurality of high resolution monochrome image frames, said first plurality of pixels is a plurality of high resolution pixels, said second plurality of pixels is a plurality of low resolution pixels, each of said plurality of low resolution pixels corresponding to at least one of said plurality of high resolution pixels, said plurality of composite pixels respectively corresponding to said high resolution pixels;

producing a plurality of color determination variables for each low resolution pixel;

utilizing said plurality of color determination variables to control said step of combining said plurality of high resolution monochrome image frames with said plurality of color image frames;

producing a low resolution grayscale value variable for each pixel in each of said plurality of color image frames;

applying said hue variable to said portion of said plurality of composite image pixels;

applying said saturation variable to said portion of said plurality of composite image pixels; and producing a composite grayscale value variable from said low resolution grayscale value variable and from at least one of said high resolution value variable.

24. A method for reproducing visual images comprising the steps of:

directing a plurality of visual images to a first image sensor and a second image sensor;

producing a plurality of monochrome image frames respectively from said plurality of visual images, each of said plurality of monochromatic image frames having a first plurality of pixels;

producing a plurality of color image frames respectively from said plurality of visual images, each of said plurality of color image frames having a second plurality of pixels;

respectively combining said plurality of monochrome image frames with said plurality of color image frames to produce a plurality of composite image frames, each of said plurality of composite image frames having a plurality of composite pixels;

viewing said plurality of color image frames;

selectively editing said plurality of color image frames whereby a portion of said plurality of color image frames are discarded to result in a resultant plurality of color image frames;

matching said resultant plurality of color image frames with respective said plurality of monochrome image frames to produce a resultant plurality of monochrome image frames; and discarding any one of said plurality of monochrome image frames not corresponding to any one of said resultant plurality of monochrome image frames.

25. An apparatus for producing a color image from a visual input comprising:

an optical assembly for receiving said visual input;

a first sensor operably connected to said optical assembly, said first sensor producing a monochromatic image from said visual input;

a second sensor operably connected to said optical assembly, said second sensor producing a color image from said visual input;

a processor for producing a composite image from said monochromatic image and said color image;

wherein said first sensor is high resolution respective to said second sensor;

wherein said first sensor produces a first plurality of pixels representative of said visual image;

wherein said second sensor produces a second plurality of pixels representative of said visual image;

wherein each of said second plurality of pixels corresponds to at least one of said first plurality of pixels;

wherein each of said first plurality of pixels has a grayscale value;

wherein each of said second plurality of pixels has a hue value and a saturation value;

wherein said composite image comprises a third plurality of pixels, said third plurality of pixels respectively corresponding to said first plurality of pixels;

wherein each of said third plurality of pixels has a composite grayscale value;

wherein each of said third plurality of pixels has a composite hue value, said composite hue value being calculated from said hue value of one of said second plurality of pixels and from grayscale values of a group of pixels of said first plurality of pixels, said group of pixels being adjacent to each respective corresponding said first plurality of pixels; and wherein each of said third plurality of pixels has a composite saturation value, said composite saturation value being calculated from said saturation value of one of said second plurality of pixels and from grayscale values of a group of pixels of said first plurality of pixels, said group of pixels being adjacent to each respective corresponding said first plurality of pixels.

* * * * *